United States Patent

Mauvernay et al.

[11] 3,857,848
[45] Dec. 31, 1974

[54] 3-(2-OXO-2-PHENYLETHYL)QUINUCLI-DINES AND PROCESS THEREFOR

[75] Inventors: Roland Yves Mauvernay, Riom; Norbert Busch, Yssac La Tourette; André Monteil, Gerzat; Jacques Simond, Chamalieres; Jacques Moleyre, Menetrol, all of France

[73] Assignee: Societe Anonyme Centre Europeen De Recherches Mauvernay, Puy-de-Dome, France

[22] Filed: May 9, 1973

[21] Appl. No.: 359,576

[30] Foreign Application Priority Data
May 10, 1972  France .............................. 72.16746

[52] U.S. Cl. ............................ 260/293.53, 424/267
[51] Int. Cl. ............................................. C07d 39/06
[58] Field of Search ................................ 260/293.53

[56] References Cited
UNITED STATES PATENTS
3,542,791  11/1970  Moffett .......................... 260/294.7

OTHER PUBLICATIONS

Braschler et al., Helv. Chim. Acta 46(7), 2646–2658, (1963).

Grob et al., Helv. Chim. Acta 50(8), 2531–2542, (1967).

*Primary Examiner*—G. Thomas Todd
*Attorney, Agent, or Firm*—Burgess, Dinklage & Sprung

[57] ABSTRACT

New quinuclidine derivatives useful as antihypertensive drugs and having the formula:

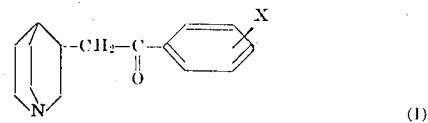

wherein the substituent X can be a hydrogen atom, a halogen atom, a —CF₃ radical or an alkoxy radical.

10 Claims, No Drawings

3-(2-OXO-2-PHENYLETHYL)QUINUCLIDINES AND PROCESS THEREFOR

The present invention relates to new derivatives of quinuclidine, a method for obtaining them and their applications, notably as antihypertensive drugs.

The present invention concerns derivatives of quinuclidene having the general formula:

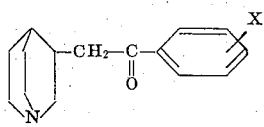

(I)

wherein the substituent —X can be a hydrogen atom, a halogen atom, a —CF$_3$ radical or an alkoxy radical.

The substituent X is preferably situated in the meta or para position with respect to the side chain.

As an alkoxy radical, the radical X preferably represents a lower alkoxy radical such as the —OCH$_3$ radical.

The invention also relates to the addition salts of compounds (I) with organic pharmaceutically acceptable acids such as lower carboxylic acids, such as fumaric, citric, picric acids among others, or inorganic acids such as hydrochloric, hydrobromic and hydrodic acids as well as the salt formed with methylsulfuric acid, and other acids known in the pharmaceutic art.

Another aspect of the invention is a process for obtaining compounds (I) wherein, in a first step, there is treated quinuclidine 3-one (II)

(II)

with cyanoacetic acid of formula:

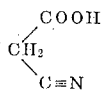

which results in a mixture of two nitriles having the formula:

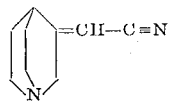

and

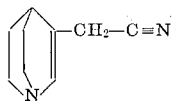

the said process being characterized in that, in a second step, the said mixture of nitriles is submitted to catalytic hydrogenation conditions providing a nitrile of the formula:

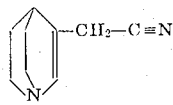

and that, in a third step, there is reacted with the nitrile obtained after the second step an organo-magnesium reagent of the formula:

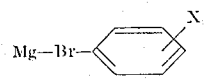

wherein X has the sense previously given, as a result of which there is obtained an imine of the formula:

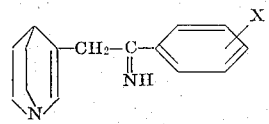

after which said imine is subjected to acid hydrolysis conditions to obtain the corresponding ketone which is the compound desired (I).

The three-step process according to the invention, which uses quinuclide-3-one as starting product, can be illustrated by the following reaction diagram:

1st step:

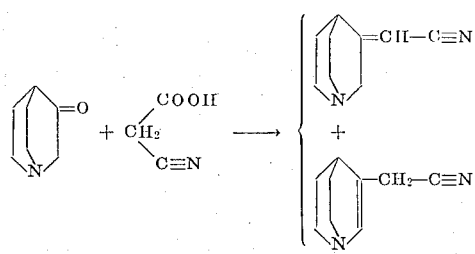

2nd step

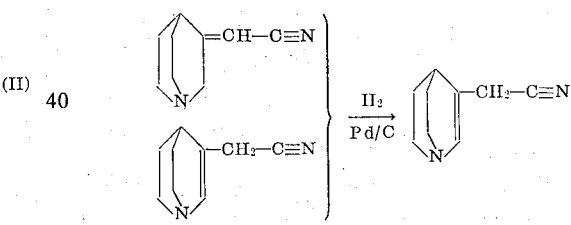

3rd step:

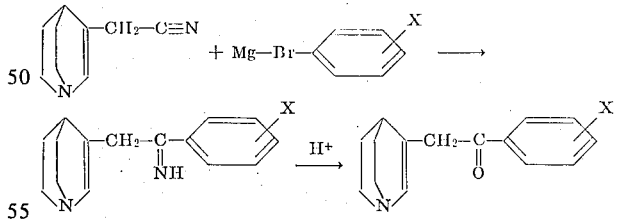

The first step is a Knoevenagel condensation the particular application of which to quinuclidine 3-one has been described by E. E. Mikhlina and M. V. Rubtsov: Zh. Obshch Khim. 32, 2935-40(1962).

According to an original feature of the invention, the mixture of two unsaturated nitriles, obtained at the end of the first step, is hydrogenated under suitable hydrogenation conditions, that is to say treated with hydrogen at a pressure greater than atmospheric pressure in the presence of a catalyst, such as palladium on an active carbon substrate. A catalyst suited to the requirements of the invention contains 5% palladium on active carbon. The reaction is advantageously carried out at ambient temperature.

In the third step of the process, an organomagnesium compound is reacted with the nitrile of the preceding step, after which the imine obtained is hydrolyzed into a ketone. The reaction of the magnesium compound and the nitrile is carried out, for example, in a solvent such as anhydrous ether, at a temperature higher than ambient temperature, notably the reflux temperature of the solvent. After isolation of the imine by the usual means, acid hydrolysis is effected, using hydrochloric acid for example.

As an example given purely by way of illustration synthesis of 3-[2-oxo 2(4-fluoro)phenylethyl] quinuclidine will be described hereinbelow.

First Step

In a 500 ml three-necked flask provided with a Dean-Stark type separator there is heated with reflux, while stirring 27g quinuclidine 3-one (0.22M) and 20.4g cyanoacetic acid (0.24 M) in 50 ml of anhydrous benzene in the presence of 0.9g ammonium acetate.

When no more water decants off the mixture is cooled and acidified by the addition of 50 ml aqueous (10%) HCl. The aqueous phase is collected and rendered alkaline with washing soda.

Following ether-extraction drying is effected with anhydrous $Na_2SO_4$.

After evaporation of the solvent 23g of product crystallizes out, viz., a mixture of two isomers:

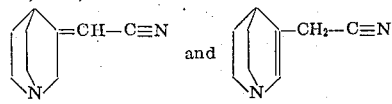

Second step 3-(cyano)-methyl qulinuclidine 23g of the product of step 1 are dissolved in 400 ml ethanol and hydrogenated at ambient temperature at a pressure of 2 kg/cm² in the presence of 2g palladium at 5% on active carbone.

When absorption of hydrogen has ended the catalyst is filtered, the solvent is evaporated and the product is vacuum rectified to obtain 20g of 3-(cyano)-methylquinuclidine $E_{0.5} = 100°C \quad n_D^{22°} = 1,5025$ Third step 34g of 4-fluorobenzene in 100 ml anhydrous ether is added to 4.8g of magnesium turnings in 20ml ether.

To the solution of magnesium reagent so obtained there is added, drop by drop, a solution of 15g of the nitrile of the second step dissolved in 100 ml anhydrous ether. This addition is carried out drop by drop in order to maintain a slight reflux of the ether.

The solution is further reflux heated for 1 hour and allowed to cool to ambient temperature. This solution is then hydrolyzed with a $NH_4Cl$ saturated solution.

After decantation, the ether phase is collected and after having stripped the solvent the residue has 50ml HCl ~ 4N added to it. The solution is refluxed for one-half hour.

After cooling the solution is rendered alkaline with NaOH and extracted with ether. After evaporation of the solvent, 13g of crude product is obtained.

50 ml absolute ethanol is added and the solution is acidified with a saturated solution of anhydrous HCl in absolute ethanol.

After filtration and drying, 10g of hydrochloride is obtained:

| Analysis | M = 283.8 | | F = 204°C | |
|---|---|---|---|---|
| | C% | H% | | N% |
| Calculated: | 63.18 | 6.74 | | 4.93 |
| Found: | 63.10 | 6.70 | | 4.80 |

The following table I gives the data of a certain number of compounds of the invention which were prepared under conditions similar to those previously described with equivalent amounts of the corresponding reagents. The representative compound prepared as described above is given in the table as reference 1.

The new compounds are useful as remedies for man and animals, notably as antihypertensive agents. The results of certain pharmacological studies will now be given by way of explanation.

The properties of the compounds according to the invention on the blood pressure of an anesthetized animal with normal blood pressure were studied first. The antihypertensive properties were then studied on animals suffering from high blood pressure and certain cardiovascular actions were inquired into, using the most representative element of the family.

I. Action on the Blood Pressure of an Anesthetized Dog with Normal Blood Pressure On dogs anesthetized with chloralose, the blood pressure (B.P.) is taken on the carotid artery using a pressure cell, recording being effected with a dynograph.

The following table II gives, for each product administered at the doses indicated, firstly, the percentage of the variation in blood pressure compared with the initial value and, secondly, the duration of the effect.

TABLE I

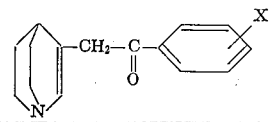

| COMPOUND N° | -X | SALT MELTING POINT °C | C% | | H% | | N% | | M |
|---|---|---|---|---|---|---|---|---|---|
| | | | calculated | found | calculated | found | calculated | found | |
| 1 | p. - F | hydrochloride 204° | 63.18 | 63.10 | 6.34 | 6.70 | 4.93 | 4.90 | 283.8 |
| 2 | p. - Cl | hydrochloride 245° | 60.00 | 60.36 | 6.38 | 6.57 | 4.67 | 4.66 | 300.2 |
| 3 | m. - CF₃ | hydrochloride 203° | 57.52 | 57.20 | 5.37 | 5.87 | 4.19 | 4.12 | 333.8 |
| 4 | -H | hydrochloride 238° | 67.78 | 67.40 | 7.61 | 8.21 | 5.27 | 5.26 | 265.8 |
| 5 | p. - OCH₃ | hydrochloride 205° | 64.96 | 64.57 | 7.49 | 7.62 | 4.73 | 4.68 | 295.8 |

The table II also gives the results obtained with quanethidine or [ 2-(octahydro-1-azocinyl)ethyl]-guanidine sulphate, a compound taken as a reference and as an antihypertensive product.

TABLE II

| Compound N° | Dose and mode of administration | % B.P. variation | Duration of action |
|---|---|---|---|
| 1 | 1.25 mg/kg I.V. | −15 | 40 min |
|   | 5 mg/kg I.V. | −67 | >1 h 30 |
|   | 10 mg/kg I.D. | −21 | >1 h 15 |
| 2 | 5 mg/kg I.V. | −35 | 30 min. |
| 3 | 5 mg/kg I.V. | −23 | 3 min |
| Guanethidine | 0.25 mg/kg I.V. | −12 | Not given owing to the latency of the action |

Table II shows the particularly favorable results of the compounds according to the invention on the blood pressure and the persistence of this effect, even at small doses.

II. Antihypertensive properties of compound No. 1 on an animal suffering from high blood pressure These properties were notably sought on the dog in the wide-awake state in which a state of high blood pressure was set up by partial stenosis of a renal artery and contralateral nephrectomy. Blood pressure is measured continuously on the animal in the wide-awake state after transcutaneous puncture of the femoral artery.

Compound No. 1 was administered by the oral method, in a capsule, at rates of 10 and 20 mg/kg.

It was compared with guanethidine (25mg/kg) and α-methyldopa (50 mg/kg). Results:

Table III below gives the maximal variations observed is systolic, diastolic and mean pressures as well as in the duration on diastolic pressure.

Total Peripheral Resistances and Cardiac Contraction

On a freely breathing dog anesthetized with chloralose the following are recorded:
— aortic flow using an electromagnetic flowmeter
— aortic pressure using a pressure cell enabling the total peripheric resistances to be calculated as being:

aortic BP/aortic flow

— ventricular inotropism using a stress gauge sewn on the left ventricle.

The heart rate is recorded by a cardio-tachometer from an electrocardiogram.

Table IV gives the percentage of maximal variations obtained in time $t$ compared with the values obtained with an untreated control lot at the same time $t$ for compound No. 1 and for two reference compounds.

TABLE IV

| PRODUCT | AORTIC FLOW | | PERIPHERAL RESISTANCE | | AMPLITUDE OF VENTRICULAR CONTRACTIONS | | BLOOD PRESSURE | | CARDIAC RATE | |
|---|---|---|---|---|---|---|---|---|---|---|
|  | Treated | controls | Treated | control | Treated | Controls | Treated | Controls | Treated | controls |
| Compound n°1 (1.25mg/kg I.V.) | −18 | −13.5 | −25.6 | 0 | −18.4 | C | −20 | 0 | +24 | 0 |
| Guanethidine (1 mg/kg I.V.) | −29 | −13.5 | +66.5 −7.5/ +35$^{(1)}$ | +18.5 0/+22.5$^{(1)}$ | −10 | 0 | −6 | 0 | +35°/ −19$^{(1)}$ | 0/0$^{(1)}$ |
| Mecamylamine$^{(2)}$ (0.25mg/kg I.V. | −22 | −14 |   |   | −16.9 | −3.2 | −16 | 0 | −15.5 | 0 |

$^{(1)}$ x/y : two-phase result
$^{(2)}$ N,2,3,3-tetramethyl-2-norcamphanamine.

The compound studied only slightly modifies aortic flow, the maximal value recorded being close to that which appeared spontaneously at the same time $t$ in control animals.

Peripheral resistances are very substantially lowered, which shows the action of the product on vascular caliber (vasodilation). Cardiac contractions are moderately reduced and the heart rate is accelerated, but only briefly.

The reference products studied lower the heart rate more substantially and do not reduce the peripheral resistances which are, on the contrary, strengthened.

Taking into account the pharmacological results obtained, the compounds of the invention can be used in human therapy for high blood pressure diseases of all origins at daily doses which may vary from 50 to 200mg. The compounds can be used in the natural state or in the form of their pharmaceutically acceptable salts. They can be administered by the oral, parenteral or duodenal way.

TABLE III

| PRODUCT | dose mg/kg | SYSTOLIC BP | | | DIASTOLIC BP | | | HEART RATE | | | DURATION ON DIASTOLIC |
|---|---|---|---|---|---|---|---|---|---|---|---|
|  |  | before | after | % | before | after | % | before | after | % |  |
| Compound N°1 | 10 | 18,8 | 16.7 | −11.2 | 12.4 | 10.2 | −17.7 | 128.5 | 111 | −13,7 | 1 hour 15 min. |
|  | 20 | 19.6 | 15.1 | −23 | 12.8 | 9.3 | −27.4 | 130.3 | 88 | −32.5 | more than 5 hours |
| Guanethidine | 25 | 19.4 | 18 | −7.2 | 12.7 | 11.5 | −9.5 | 125.7 | 138 | +9.8 | 20 minutes |
| α-Methyldopa | 50 | 19.6 | 15.2 | −22.5 | 13.8 | 8.8 | −36.2 | 126.4 | 86 | −32 | more than 5 hours |

These results show that compound 1 has significant antihypertensive effects both as regards intensity and the duration of the fall in blood pressure.

This product is shown to be better than GUANETHIDINE and α-METHYLDOPA administered at higher doses.

III. The Action of Compound No. 1 on Aortic Flow,

What we claim is:

1. A derivative of quinuclidine having the general formula:

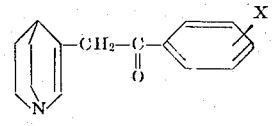

(1)

wherein the substituent X is a hydrogen atom, a halogen atom, a —CF₃ radical or a lower alkoxy radical.

2. The derivative of claim 1, wherein X is the —OCH₃ radical.

3. The derivative of claim 1 wherein X is situated in the meta position with respect to the side chain.

4. The derivative of claim 1 wherein X is situated in the para position with respect to the side chain.

5. An addition salt of the derivative of claim 1 with a pharmaceutically acceptable acid.

6. An addition salt of the derivative of claim 1 with hydrochloric acid.

7. A process for obtaining a derivative of quinuclidine having the general formula:

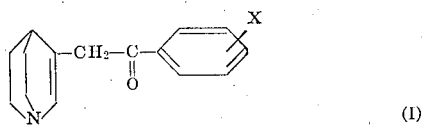

(I)

wherein the substituent X is a hydrogen atom, a halogen atom, a —CF₃ radical or an alkoxy radical, wherein in a first stage quinuclidine 3-one (II)

(II)

is treated with cyanoacetic acid of the formula

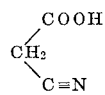

which gives a mixture of two nitriles having the formulae:

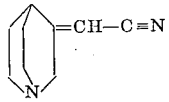

and

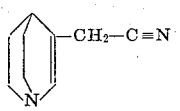

in a second step the said mixture of nitriles is subjected to catalytic hydrogenation conditions providing a nitrile of the formula:

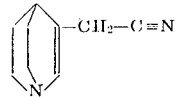

and in a third step there is reacted on the nitrile obtained at the end of the second step an organomagnesium reagent of the formula:

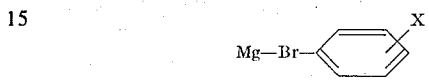

wherein X has the meaning previously given, as a result of which there is obtained an imine of the formula:

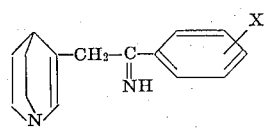

after which said imine is subjected to acid hydrolysis conditions to obtain the corresponding ketone which is the compound (I) desired.

8. The process of claim 8 wherein the mixture of two unsaturated nitriles obtained at the end of the first step is treated with hydrogen gas at a pressure higher than atmospheric pressure in the presence of a catalyst.

9. The process of claim 8 wherein the catalyst consists of palladium on active carbon.

10. The process of claim 7 wherein there is effected an additional step consisting in the addition of a pharmaceutically acceptable acid to the compound obtained at the end of the last step, resulting in an addition salt of compound (I).

* * * * *

UNITED STATES PATENT OFFICE
CERTIFICATE OF CORRECTION

Patent No. 3,857,848  Dated December 31, 1974

Inventor(s) ROLAND YVES MAUVERNAY ET AL

It is certified that error appears in the above-identified patent and that said Letters Patent are hereby corrected as shown below:

Col. 6, Table III, under heading "DURATION OF DIASTOLIC" cancel "%" at first line and under heading "HEART RATE" insert --%-- above third column of figures.

Cols. 5 and 6, cancel Table IV and substitute therefore

TABLE IV

| PRODUCT | AORTIC FLOW | | PERIPHERAL RESISTANCE | | AMPLITUDE OF VENTRICULAR CONTRACTIONS | | BLOOD PRESSURE | | CARDIAC RATE | |
|---|---|---|---|---|---|---|---|---|---|---|
| | Treated | controls | Treated | control | Treated | Controls | Treated | Controls | Treated | controls |
| Compound n°1 (1.25mg/kg I.V.) | -18 | -13.5 | -25.6 | 0 | -18.4 | 0 | -20 | 0 | +24 | 0 |
| Guanethidine (1 mg/kg I.V.) | -29 | -13.5 | +66.5 | +18.5 | -10 | 0 | -6 | 0 | +35%/-19''' | 0/0''' |
| Mecamylamine[2] (0.25mg/kg I.V. | -22 | -14 | -7.5/+35''' | 0/+22.5''' | -16.9 | -3.2 | -16 | 0 | -15.5 | 0 |

[1] x/y : two-phase result
[2] N,2,3,3-tetramethyl-2-norcamphanamine.

Signed and sealed this 6th day of May 1975.

(SEAL)
Attest:

RUTH C. MASON
Attesting Officer

C. MARSHALL DANN
Commissioner of Patents
and Trademarks